(No Model.)

L. W. LINDLEY.
MOTOR FOR CHURNS, &c.

No. 438,011. Patented Oct. 7, 1890.

WITNESSES:
Edwin L. Bradford
C. D. Davis

INVENTOR
L. W. Lindley
BY C. M. Alexander
ATTORNEY.

UNITED STATES PATENT OFFICE.

LAFAYETTE W. LINDLEY, OF LOUISVILLE, KENTUCKY.

MOTOR FOR CHURNS, &c.

SPECIFICATION forming part of Letters Patent No. 438,011, dated October 7, 1890.

Application filed January 23, 1890. Serial No. 337,793. (No model.)

*To all whom it may concern:*

Be it known that I, LAFAYETTE W. LINDLEY, a citizen of the United States, residing at Louisville, in the county of Jefferson and State of Kentucky, have invented certain new and useful Improvements in Motors for Churns, &c., of which the following is a specification, reference being had therein to the accompanying drawings, in which—

Figure 1:
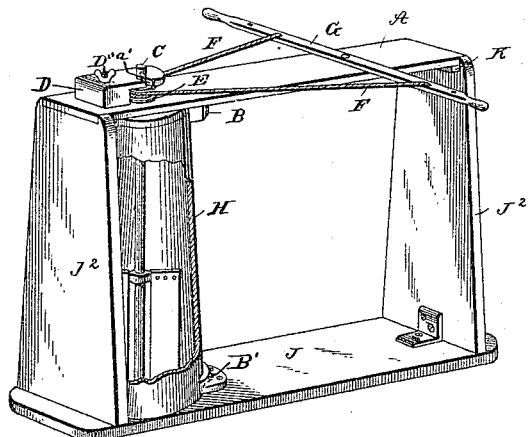
Figure 2:
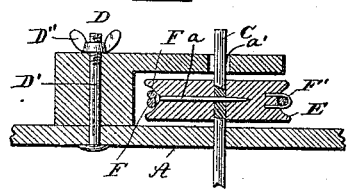

Figure 1 represents a perspective view of my improved churn-operating mechanism and stand complete, a portion of the churn-vessel being broken away; Fig. 2, a detail sectional view showing the manner of attaching driving-pulley to shaft, and Fig. 3 a perspective view of a slight modification of my invention adapted to be employed as a fan-operating mechanism and operated by means of a rocking-chair.

Referring to these drawings by letter, J designates a base-board having erected on its ends standards $J^2$ $J^2$, provided with notches in their upper ends. Resting removably in the notches formed in these supports is a horizontal bar or board A, provided with transverse abutments or cleats K near its ends to hold it in place on the standards. Upon and near one end of the base-piece is placed the churn-vessel H, upon the upper end of which rests the board A, blocks B B' being provided to prevent the vessel shifting during the operation of churning.

The rotary dasher-shaft C extends up through an aperture in the top piece, and has removably secured to such extended portion by means of a removable pin $a$ a pulley E, the said pin passing through the pulley and shaft, as shown in Fig. 2.

A rope F is wound around the pulley once or twice, and has its ends secured to the opposite ends of a lever G, pivoted upon the opposite end of the board A, the rope being secured to the pulley at the side nearest the lever by means of a staple F', as shown in Fig. 2.

A block D is pivotally bolted by means of a vertical bolt D' and a thumb screw or nut D'' to the board A on the opposite end from the lever G, and this block has an extension which reaches over the grooved pulley and protects the same and prevents the rope from becoming displaced. The extension of this block has a lateral slot $a'$ for the reception of the upper end of the dasher-shaft, for which it affords a bearing and brace. When it is desired to slip the pulley off the shaft and remove the shaft and dashers, it is simply necessary to loosen the thumb-nut D'' and turn the block D around upon its pivotal bolt a sufficient distance to free the shaft and then remove the pin $a$. The board A, with its attached parts, (viz., lever and cord, shaft and blades, and pulley and block D,) may be readily lifted off the standards without removing or loosening any of the parts, except the cover of the churn-vessel. The churning may be accomplished by working the lever back and forth by hand or in any other suitable manner, which action causes the shaft to revolve very rapidly first in one direction and then in the other direction. Instead of operating the handle G by hand, any suitable mechanism may be employed for that purpose.

Figure 3:
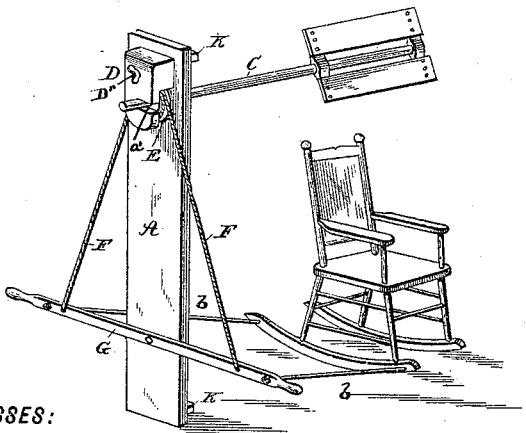

By removing the board A from its supports and securing it in a vertical position upon the floor by attaching it to the wall or a table, it will be observed from Fig. 3 that the device may be employed as a fan, the lever G being connected at its opposite ends by means of rods $b$ $b$ to the opposite ends of a chair-rocker, whereby the rocking motion of the chair may be utilized to rotate the dasher or fan-blades on the shaft C. Thus it will be perceived that the invention may be employed without change either as a churn or as a rotary fan.

I claim—

1. The combination, with a base and notched standards, of a top board resting removably in said notches, a shaft to be operated, a pulley on said shaft, a pivoted slotted block on the top board adapted to afford a bearing for the upper end of the shaft, a lever pivoted on the top board, and a rope or cord wound around the pulley and connected to the opposite ends of the said lever, substantially as described.

2. A board A, a shaft C, carrying blades and passing through the said board, a removable pulley secured on said shaft, a pivoted lever G, a cord or rope wound around the pulley and connected to the opposite ends of the lever G, a pivoted slotted block D, secured to the board and affording a bearing for the said shaft, substantially as described.

In testimony whereof I affix my signature in presence of two witnesses.

LAFAYETTE W. LINDLEY.

Witnesses:
JAS. F. DITTMAN,
I. HULL.